United States Patent [19]
Storace et al.

[11] 3,878,025
[45] Apr. 15, 1975

[54] ENVELOPE FLAP SEALING MECHANISM

[75] Inventors: Anthony Storace, Tarrytown, N.Y.; Paul R. Sette, Hamden, Conn.

[73] Assignee: Pitney-Bowes, Inc., Stamford, Conn.

[22] Filed: Apr. 8, 1974

[21] Appl. No.: 459,031

[52] U.S. Cl................ 156/441.5; 93/61 R; 156/555
[51] Int. Cl........................... B29h 9/00; B31b 1/00
[58] Field of Search.......... 156/441.5, 442.1, 442.2, 156/555; 93/61 R

[56] References Cited
UNITED STATES PATENTS 2,971,416  2/1961  Von Stoeser ..................... 83/243
3,813,998  6/1974  Lotto ................................. 93/33 H Primary Examiner—Douglas J. Drummond
Attorney, Agent, or Firm—William D. Soltow, Jr.; Albert W. Scribner; Robert S. Salzman

[57] ABSTRACT

An envelope flap sealing mechanism for sealing the moistened flap of an unsealed envelope. The mechanism provides a parallelogram linkage for relieving pressure upon the envelope flap as it is introduced to a sealing roller. This pressure relieving mechanism allows the flap of the envelope to take a proper and uniform seal orientation with respect to the body of the letter. Without this pressure relief, the envelope flap would often receive a high seal.

4 Claims, 3 Drawing Figures

PATENTED APR 15 1975 3,878,025

3,878,025

ENVELOPE FLAP SEALING MECHANISM

The invention pertains to flap sealing mechanisms for sealing the moistened flap of an unsealed envelope, and more particularly to an envelope flap sealing mechanism which prevents the flap of the envelope from receiving a high seal with respect to the body of the envelope.

BACKGROUND OF THE INVENTION

Modern day needs have created a demand for higher speed mail handling devices. As a means of providing high mail handling speeds, letters are being transported through mail handling systems with a vertical orientation. This vertical orientation has caused redesign of the weighing, moistening, sealing and postage imprinting mechanisms.

As regards the moistening and sealing of unsealed pieces of mail, the vertical orientation of the letters has introduced a problem of properly sealing moistened envelope flaps. Envelopes moving vertically through a mail handling system are supported between frictionally engaging belts, or between a frictionally engaging belt and a guide support. In order to accommodate for the variation in letter thicknesses, the belt must of necessity be supported upon movable guide rollers.

In the sealing area, the movement of the belt immediately prior to the sealing area directly influences the pressure brought to bear upon the envelope flap. If the flap of the letter is forced between highly biased sealing surfaces (one of the surfaces comprising a segment of a belt supported by a guide roller), the flap is pressured into forming a high seal with respect to the envelope body.

The present invention was conceived as a means to relieve the over-biasing existing between the flap sealing roller and the belt. By uniformly moving the belt supporting guide rollers located immediately before the flap sealing area, the pressure responsible for producing high seals is alleviated from the sealing roller area.

SUMMARY OF THE INVENTION

The invention is for a flap sealing mechanism which will seal the flap of an unsealed envelope moving through a mail handling system with a substantially vertical orientation, the flap sealing mechanism comprises a belt for transporting the letter. The belt is supported by several spaced-apart rollers, two of which are located in the sealing area. One of the guide rollers is positioned adjacent a flap sealing roller, and acts both as a belt support and as a support against which the sealing roller is baised into flap sealing engagement.

Pressure is relieved between the flap sealing roller and the belt by linking the guide roller adjacent the flap sealing roller, with another spaced-apart guide roller. This linking of the two guide rollers acts to uniformly move the belt in the sealing area in response to an incoming envelope. This results in relieving the sealing pressure upon the envelope flap, so that a high seal will not be produced.

The linking of the guide rollers is accomplished by means of a four-bar linkage arranged as a parallelogram. The guide rollers are linked together so that they move in unison and in equal pivotable arcs.

It is an object of the present invention to provide an improved envelope flap sealing mechanism.

It is another object of this invention to provide an envelope flap sealing mechanism which seals the flap of an unsealed envelope to the body of the envelope as it moves through a mail handling system with a substantially vertical orientation.

It is a further object of the invention to provide an envelope flap sealing mechanism which will prevent the high sealing of the flap to the envelope body.

These and other objects of this invention will become more apparent and will be better understood with reference to the following detailed description taken in conjunction with the accompanying drawings, in which.

DETAILED DESCRIPTION

Generally speaking, the invention is for an envelope flap sealing mechanism. The inventive mechanism prevents the flap of an unsealed envelope from being high sealed to the body of the envelope. The mechanism comprises means defining an envelope feed path, and a belt for transporting the envelope along this feed path to a sealing roller. A pair of rotative, spaced-apart guide rollers support the belt, and are contiguously disposed along the feed path. A flap sealing roller is disposed adjacent one of the guide rollers. An unsealed envelope is received between these adjacent rollers and the flap is caused to be pressed upon the body of the envelope as the envelope moves past. means are provided for biasing the flap sealing roller towards sealing engagement with the adjacent guide roller. Linkage means interconnect the guide rollers such that they move in unison, and each of them are substantially equally movable with respect to the feed path. The belt supported by the guide rollers will be substantially uniformly movable with respect to the feed path as a consequence of the guide roller movement, and the unsealed envelope being transported by the belt will therefore be properly and uniformly sealed as the envelope moves past the sealing roller.

Figure 1:
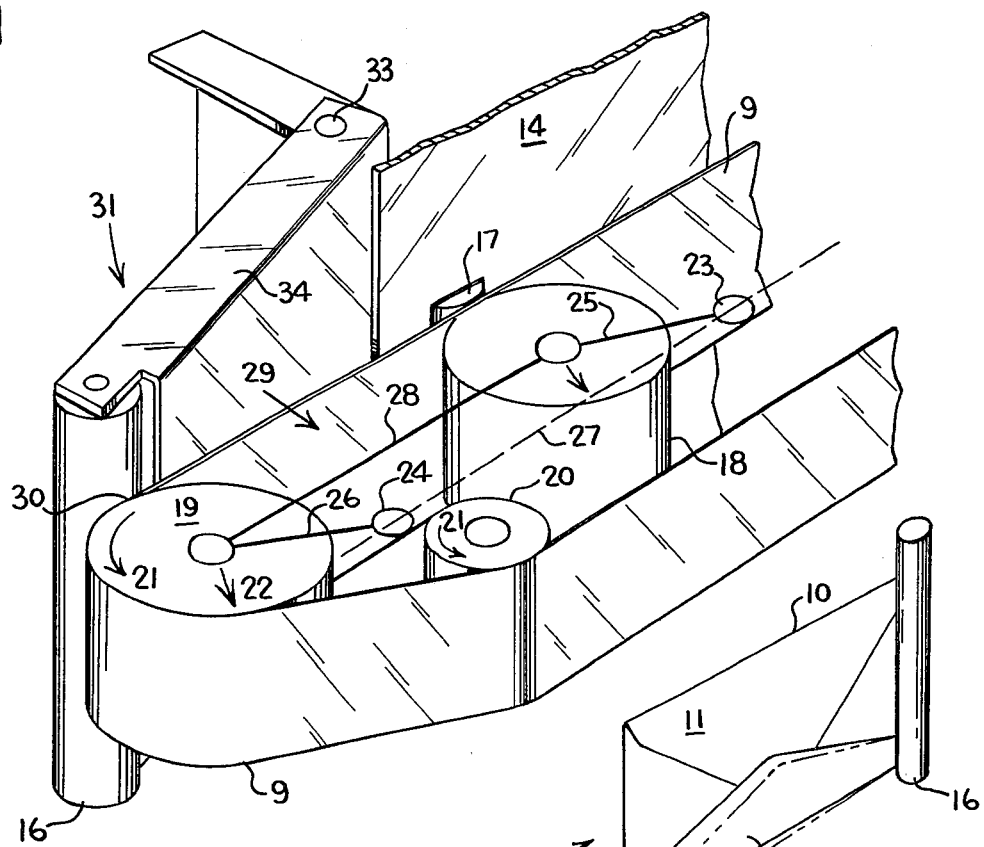
FIG. 1 is a perspective view of the envelope flap sealing mechanism of this invention.
Figure 3:
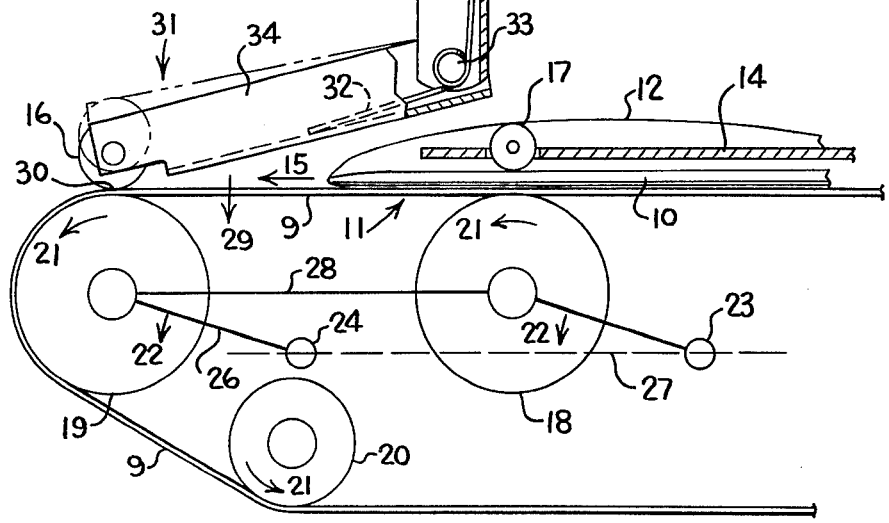
FIG. 3 is a top view of the envelope flap sealing mechanism of FIG. 1.

Now referring to FIGS. 1 and 3, the envelope flap sealing mechanism of this invention is shown. The mechanism comprises a moving belt, which frictionally engages with the body 10 of a vertically oriented envelope 11 (FIG. 3) and causes the envelope 11 to move (arrow 15) toward sealing roller 16. The flap 12 of the envelope is separated from the body 10 and is directed behind a separating guide plate 14. The feed path of the envelope is defined by belt 9 and guide plate 14. The flap 12 has been moistened by a moistening mechanism (not shown) and the moistened flap 12 will be pressed upon the body 10 of the envelope 11 as the envelope moves past the sealing roller 16.

The body 10 of the vertically oriented envelope 11 moves smoothly past the guide plate 14 due to roller 17, which rotatably engages with the envelope body.

The belt 9 is supported by a plurality of guide rollers 18, 19 and 20, respectively. The guide rollers are free to rotate (arrows 21) so that the belt 9 is free to continuously move over the guide rollers. Rollers 18 and 19 are connected to links 25 and 26, respectively and are free to pivotably move (arrow 22) with respect to their respective pivot link connection 23 and 24. The link connections 23 and 24 lie along a line 27, which is parallel to a connecting link 28 joining guide rollers 18 and 19, the interconnecting arrangement of links 25, 26 and 28, is such that they form a parallelogram with base line 27. As different thicknesses of envelopes move between guide plate 14 and belt 9, the belt 9 is free to uniformly separate (arrow 29) from the guide plate 14. This results from the fact, that the guide rollers 18 and 19 will move in unison and will uniformly and equally pivot about pivotable connectons 23 and 24, respectively, due to the nature of the parallelogram linkage.

The uniform separation of the belt 9 immediately adjacent the sealer roller 16, relieves the pressure at the sealing surface 30. The sealing pressure exerted upon the envelope flap 12, is now almost entirely the result of the force 31 exerted upon the sealing roller 16, due to spring 32 (FIG. 3). The sealing roller 16 is pivotably movable about the pivot 33, via pivot arm 34. The spring 32 acting against the pivot arm 34 causes the sealing roller 16 to press upon the envelope flap 12 as it passes between the sealing roller and belt 9.

Figure 2:
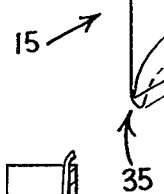
FIG. 2 is a perspective view of a properly sealed envelope, with a high seal shown in phantom.

With the relief of pressure at the sealing surface 30, the envelope flap 12 will be properly pressed upon the body 10 of the envelope 11 as illustrated by solid lines in FIG. 2.

A high seal 35 is shown by the phantom lines of FIG. 2. The original excessive pressure at sealing roller surface 30, would cause the high seal 35 in flap 12. With the uniform separation of belt 9, however, a high seal 35 will no longer result.

As will be obvious to the skilled practitioner, the unified and uniform movement of the guide rollers and belt may be achieved by using other linkage arrangements, such as intermeshing pivot arms. The particular parallelogram linkage of this invention is deemed to be illustrative only, and is merely shown to provide an understanding of the invention.

The spirit and scope of the invention is considered to lie within those limits defined by the appended claims.

What is claimed is:

1. An envelope flap sealing mechanism which prevents the flap of an unsealed letter from being high-sealed to a body portion of the envelope, said flap sealing mechanism comprising:
   means defining an envelope feed path for conveying an envelope in substantially vertical orientation past a flap sealing roller;
   a belt for transporting the envelope along said feed path with said substantially vertical orientation.
   a pair of rotative, spaced-apart guide rollers disposed continuously along said feed path and supporting said belt;
   a flap sealing roller disposed adjacent of one of said guide rollers for receiving an unsealed envelope therebetween, and for causing the flap of said envelope to press upon the body of the envelope as the envelope moves past;
   means for biasing said flap sealing roller towards sealing engagement with the adjacent guide roller; and
   linkage means interconnecting said pair of spaced-apart guide rollers, said linkage means interconnecting said guide rollers such that said pair of guide rollers move in unison, and each of said guide rollers being substantially equally movable with respect to said feed path, said belt supported by the guide rollers consequently being substantially uniformly movable with respect to said feed path, whereby an unsealed envelope being transported by said belt will be properly and uniformly sealed as it moves past said sealing roller.

2. The envelope flap sealing mechanism of claim 1, wherein said linkage means comprises a four-bar linkage with the guide rollers being tied to a common bar extending between them.

3. The envelope flap sealing mechanism of claim 2, wherein said four-bar linkage comprises links arranged as a parallelogram with the guide rollers bieng supported by equal pivotable links.

4. An envelope flap sealing mechanism which prevents the flap of an unsealed letter from being high-sealed to a body portion of the envelope, said flap sealing mechanism, comprising:
   means defining an envelope feed path for conveying an envelope past a flap sealing roller;
   a belt for transporting the envelope along said feed path;
   a pair of rotative, spaced-apart guide rollers disposed contiguously along said feed path and supporting said belt;
   a flap sealing roller disposed adjacent one of said guide rollers for receiving an unsealed envelope therebetween, and for causing the flap of said envelope to press upon the body of the envelope as it moves past;
   means for biasing said flap sealing roller towards sealing engagement with the adjacent guide roller; and
   a parallelogram linkage means interconnecting said pair of spaced apart guide rollers such that said guide rollers move in unison, and are substantially equally movable with respect to said feed path, said belt supported by said guide rollers consequently being substantially uniformly movable with respect to said feed path, whereby an unsealed envelope being transported by said belt will be properly and uniformly sealed as the envelope moves past said sealing roller.

* * * * *